(12) United States Patent
Lan (10) Patent No.: US 11,162,027 B2
(45) Date of Patent: Nov. 2, 2021

(54) LIQUID CRYSTAL MATERIAL, METHOD OF MANUFACTURING LIQUID CRYSTAL DISPLAY PANEL, AND DISPLAY PANEL

(71) Applicant: TCL CHINA STAR OPTOELECTRONICS TECHNOLOGY CO., LTD., Guangdong (CN)

(72) Inventor: Song Lan, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/627,801

(22) PCT Filed: Dec. 27, 2019

(86) PCT No.: PCT/CN2019/129310
§ 371 (c)(1),
(2) Date: Dec. 31, 2019

(87) PCT Pub. No.: WO2021/114423
PCT Pub. Date: Jun. 17, 2021

(65) Prior Publication Data
US 2021/0179941 A1    Jun. 17, 2021

(51) Int. Cl.
*C09K 19/20*    (2006.01)
*C09K 19/56*    (2006.01)
*C09K 19/34*    (2006.01)
*C09K 19/54*    (2006.01)
*G02F 1/1337*   (2006.01)

(52) U.S. Cl.
CPC ...... *C09K 19/2007* (2013.01); *C09K 19/3405* (2013.01); *C09K 19/542* (2013.01); *C09K 19/56* (2013.01); *C09K 2019/3408* (2013.01); *C09K 2019/546* (2013.01); *C09K 2219/03* (2013.01); *C09K 2323/02* (2020.08); *C09K 2323/03* (2020.08); *C09K 2323/035* (2020.08); *G02F 1/1337* (2013.01)

(58) Field of Classification Search
CPC ........... C09K 2323/00; C09K 2323/02; C09K 2323/03; C09K 2323/035; C09K 19/2007; C09K 19/542; C09K 19/56; C09K 19/3405; C09K 2019/3408; C09K 2219/03; G02F 1/1337; G02F 1/133726; G02F 1/133742
USPC .... 428/1.1, 1.2, 1.3, 1.33; 349/123, 130, 75, 349/88, 117; 252/299.01
See application file for complete search history.

(56) References Cited

U.S. PATENT DOCUMENTS

2018/0105750 A1*  4/2018  Lan ................. G02F 1/133711

* cited by examiner

*Primary Examiner* — Ruiyun Zhang
(74) *Attorney, Agent, or Firm* — Mark M. Friedman (57) ABSTRACT

The present disclosure provides a liquid crystal material, a method of manufacturing a liquid crystal display panel, and a display panel. The display panel includes a thin film transistor substrate, a color film substrate, a polymer layer structure, and a liquid crystal layer. During the preparation, after three different irradiations, the liquid crystal material is directly polymerized into the first polymer layer structure and the second polymer layer structure under the irradiations, eliminating the black matrix structure and the polyimide alignment film structure, improving the display effect of the panel, and reducing preparation costs.

5 Claims, 4 Drawing Sheets

FIG. 1

```
┌─────────────────────────────────────────────────────────┐
│ preparing a thin film transistor substrate and a color  │─ S100
│ filter substrate;                                        │
└─────────────────────────────────────────────────────────┘
                            ⇩
┌─────────────────────────────────────────────────────────┐
│ formulating an additive, and mixing the additive with   │─ S101
│ liquid crystal molecules to form a liquid crystal       │
│ material;                                                │
└─────────────────────────────────────────────────────────┘
                            ⇩
┌─────────────────────────────────────────────────────────┐
│ dripping the liquid crystal material onto the thin film │
│ transistor substrate or the color filter substrate,     │
│ applying a sealant on a periphery of the thin film      │─ S102
│ transistor substrate or a periphery of the color filter │
│ substrate, and applying a conductive adhesive to a      │
│ periphery of the sealant;                                │
└─────────────────────────────────────────────────────────┘
                            ⇩
┌─────────────────────────────────────────────────────────┐
│ bonding the thin film transistor substrate to the color │
│ filter substrate, and then curing the sealant to form a │─ S103
│ liquid crystal cell, followed by irradiating the liquid │
│ crystal cell to polymerize the additive to form a       │
│ polymer layer structure;                                 │
└─────────────────────────────────────────────────────────┘
                            ⇩
┌─────────────────────────────────────────────────────────┐
│ applying a climbing voltage sequence to the liquid      │
│ crystal cell, and irradiating the liquid crystal cell   │─ S104
│ simultaneously, such that the liquid crystal molecules  │
│ are inclined, and the additive continues to polymerize; │
│ and                                                      │
└─────────────────────────────────────────────────────────┘
                            ⇩
┌─────────────────────────────────────────────────────────┐
│ removing the voltage while continuing the irradiation   │─ S105
│ to complete preparation of the liquid crystal display   │
│ panel.                                                   │
└─────────────────────────────────────────────────────────┘
```

LIQUID CRYSTAL MATERIAL, METHOD OF MANUFACTURING LIQUID CRYSTAL DISPLAY PANEL, AND DISPLAY PANEL

BACKGROUND OF INVENTION

Field of Invention

The present disclosure relates to a field of display technology, and in particular to a liquid crystal material, a method of manufacturing a liquid crystal display panel, and a display panel.

Description of Prior Art

With rapid development of display technology, flat display devices such as liquid crystal displays (LCDs) are widely used in various display fields due to their advantages of high picture quality, power saving, thin body, wide range of use, and so on.

Generally, a liquid crystal display panel is composed of a color filter (CF) substrate, a thin film transistor (TFT) substrate, and a liquid crystal (LC) layer. Some existing panels are also provided with an alignment film on the CF substrate and the TFT substrate. The alignment film is mainly made of a polyimide material, which is expensive and poor in heat-resistance and aging-resistance. Meanwhile, its production process is complicated, resulting in high cost. Some display panels use other materials instead of polyimide. The alternative materials will form a polymer layer on a substrate surface under irradiation. However, due to existence of light-shielding parts, such as a black matrix structure, in a liquid crystal cell, during the preparation process, light fails to pass through the light-shielding parts, which makes it impossible to form a polymer layer in this area, such that impurities in the panel penetrate into the liquid crystal cell, form an afterimage, and reduce display quality.

In summary, in the existing display panel, the production process of the alignment film on the substrate is complicated and the production cost is high, and in addition, in products without an alignment film structure, a complete polymer layer cannot be formed on the substrate surface, and impurities easily penetrate into the product, resulting in unsatisfactory display quality.

SUMMARY OF INVENTION

The present disclosure provides a liquid crystal material, a method of manufacturing a liquid crystal display panel, and a display panel, so as to solve the problems of high display panel production costs and complicated production processes in the existing display panels, and solve the problems of the incomplete polymer layer in the liquid crystal layer of the panel, causing impurities to easily penetrate, and unsatisfactory display quality.

To solve the above technical problems, the technical solutions provided by embodiments of the present disclosure are as follows:

According to a first aspect of an embodiment of the present disclosure, a liquid crystal material is provided, including:

liquid crystal molecules; and an additive mixed with the liquid crystal molecules, wherein the additive polymerizes under irradiation and forms a polymer layer structure, and the additive includes a reactive material including a peroxide.

According to an embodiment of the present disclosure, wherein the additive further includes a vertical alignment material.

According to an embodiment of the present disclosure, wherein the vertical alignment material includes one or more of the following compounds:

, and

.

According to an embodiment of the present disclosure, a mass percentage of the reactive material is 1.0% to 20%, a mass percentage of the vertical alignment material is 1.0% to 5.0%, and a mass percentage of the liquid crystal molecules is 75% to 90%.

According to a second aspect of an embodiment of the present disclosure, a liquid crystal material is further provided, including:

liquid crystal molecules; and an additive mixed with the liquid crystal molecules, wherein the additive polymerizes under irradiation and forms a polymer layer structure.

According to an embodiment of the present disclosure, wherein the additive further includes a vertical alignment material.

According to an embodiment of the present disclosure, wherein the vertical alignment material includes one or more of the following compounds:

,

,

-continued

, and

According to an embodiment of the present disclosure, a mass percentage of the reactive material is 1.0% to 20%, a mass percentage of the vertical alignment material is 1.0% to 5.0%, and a mass percentage of the liquid crystal molecules is 75% to 90%.

According to the second aspect of an embodiment of the present disclosure, a method of manufacturing a liquid crystal display panel is also provided, including the following steps:

S100: preparing a thin film transistor substrate and a color filter substrate;

S101: formulating an additive, and mixing the additive with liquid crystal molecules to form a liquid crystal material;

S102: dripping the liquid crystal material onto the thin film transistor substrate or the color filter substrate, applying a sealant on a periphery of the thin film transistor substrate or a periphery of the color filter substrate, and applying a conductive adhesive to a periphery of the sealant;

S103: bonding the thin film transistor substrate to the color filter substrate, and then curing the sealant to form a liquid crystal cell, followed by irradiating the liquid crystal cell to polymerize the additive to form a polymer layer structure;

S104: applying a climbing voltage sequence to the liquid crystal cell, and irradiating the liquid crystal cell simultaneously, such that the liquid crystal molecules are inclined, and the additive continues to polymerize; and S105: removing the voltage while continuing the irradiation to complete preparation of the liquid crystal display panel.

According to an embodiment of the present disclosure, in the step S103, an irradiation area includes a first filter area and a second filter area, the polymer layer structure includes a first polymer layer structure and a second polymer layer structure, the first filter area is configured to correspondingly form a first polymer layer structure, and the second filter area is configured to correspondingly form a second polymer layer structure.

According to an embodiment of the present disclosure, a height of the first polymer layer structure is greater than a height of the second polymer layer structure, opposite ends of the first polymer layer structure are respectively connected to the thin film transistor substrate and the color filter substrate, and the second polymer layer structure is distributed on opposite sides of the thin film transistor substrate and the color filter substrate that face each other.

According to an embodiment of the present disclosure, an intensity of the irradiation is 85 W/cm$^2$ to 100 mW/cm$^2$, and the first filter area and the second filter area respectively use a first cut-off filter and a second cut-off filter which are different in light transmission.

According to an embodiment of the present disclosure, in step S103, a time period for the irradiation is 10 minutes to 30 minutes.

According to an embodiment of the present disclosure, in step S104, a time period for the irradiation is 30 seconds to 100 seconds.

According to an embodiment of the present disclosure, in step S105, a time period for the irradiation is 90 minutes to 120 minutes.

According to an embodiment of the present disclosure, in the step S101, the additive includes a reactive material and a vertical alignment material.

According to an embodiment of the present disclosure, in the step of formulating an additive, a mass percentage of the reactive material is 1.0% to 20%, a mass percentage of the vertical alignment material is 1.0% to 5.0%, and a mass percentage of the liquid crystal molecules is 75% to 90%.

In summary, beneficial effects of embodiments of the present disclosure are as follows:

The present disclosure provides a liquid crystal material, a method of manufacturing a liquid crystal display panel, and a display panel. Under irradiation, the additive in the liquid crystal material will polymerize, and degree of polymerization of the additive will be different under irradiation of different intensities. Therefore, after the irradiation is completed, the first polymer layer structure and the second polymer layer structure are formed in the liquid crystal layer of the display panel, so that the polymer layer structures function to block the liquid crystal molecules and support the display panel. In an embodiment of the present disclosure, there is no need to provide a liquid crystal alignment film and a black matrix structure, which effectively reduces the production cost of the panel, improves the production process of the panel, and further improves the display quality of the display panel.

DETAILED DESCRIPTION OF PREFERRED EMBODIMENTS

The following descriptions of the embodiments are made with reference to additional drawings to illustrate specific embodiments that the present disclosure can be implemented.

Figure 1:
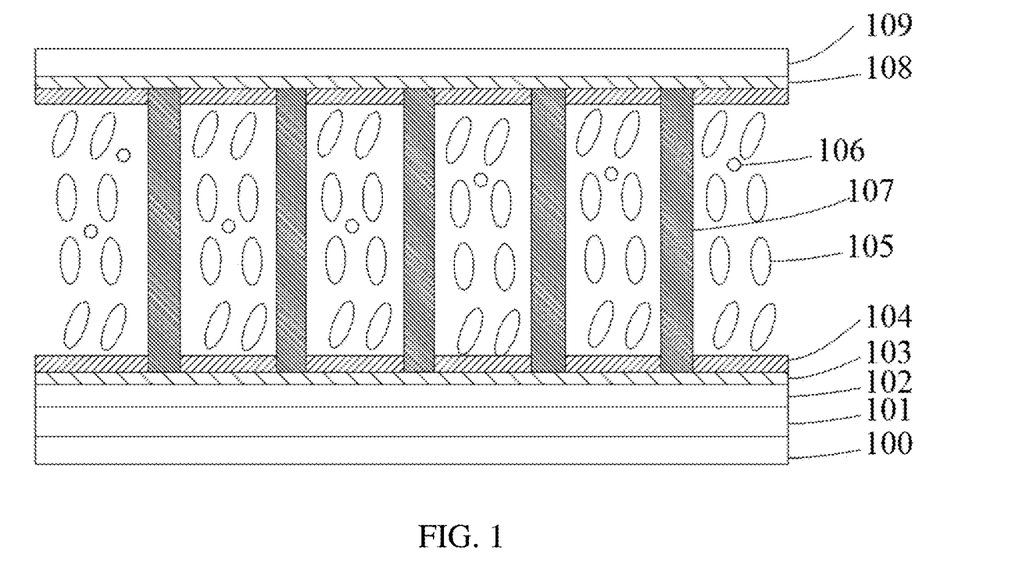
FIG. 1 is a schematic structural diagram of layers of a display panel according to an embodiment of the present disclosure.

In an embodiment of the present disclosure, a display panel is provided, as shown in FIG. 1. FIG. 1 is a schematic structural diagram of layers of a display panel according to an embodiment of the present disclosure. The display panel includes a first substrate 100, a first electrode 103, a first polymer layer structure 104, a liquid crystal layer 105, a second electrode 108, and a second substrate 109. The first substrate 100 and the second substrate 109 are disposed opposite to each other. The first electrode 103 and the second electrode 108 are disposed on opposite surfaces of the first substrate 100 and the second substrate 109 that face each other. The first polymer layer structure 104 is disposed on the first substrate 100 and the second substrate 109, and is disposed on surfaces of the two substrates that close to the liquid crystal layer 105.

Further, the display panel further includes a plurality of second polymer layer structures 107. The second polymer layer structures 107 are disposed between the first substrate 100 and the second substrate 109, a gap is located between adjacent ones of the second polymer layer structures 107, and the gap is filled with the liquid crystal material. Meanwhile, opposite ends of the second polymer layer structure 107 are connected to the first substrate 100 and the second substrate 109, respectively, so as to seal the liquid crystal between adjacent ones of the second polymer layer structures 107, and to support a liquid crystal cell constituted by the first substrate 100 and a second substrate 109.

In an embodiment of the present disclosure, the first substrate 100 may be a thin film transistor substrate, and the second substrate 109 may be a color filter substrate. The first electrode 103 may be a pixel electrode, and may be made of a material including an indium tin oxide material, and the second electrode 108 may be a common electrode. In a subsequent embodiment, a voltage is applied between the first electrode 103 and the second electrode 108 to drive movement of liquid crystal material in a liquid crystal cell.

In an embodiment of the present disclosure, the first polymer layer structure 104 and the second polymer layer structure 107 are formed by directly polymerizing a liquid crystal material under irradiation, and under irradiation, a polymerization rate of the material forming the second polymer layer structure 107 is greater than a polymerization rate of the material forming the first polymer layer structure 104. Therefore, by control the time period for the irradiation, after the polymerization is finally completed, the first polymer layer structure 104 is formed into a thin layer on the first substrate 100 and the second substrate 109, and the second polymer layer structure 107 is connected to the first substrate 100 and the second substrate 109, wherein a height of the first polymer layer structure 104 is greater than a height of the second polymer layer structure 107.

Each layer structure of the display panel may further include a color resist layer 101 and an insulating layer 102. The color resist layer 101 includes a red color resist, a blue color resist, and a green color resist. Thicknesses of the different color resists can be the same or different. The insulating layer 102 is disposed on the color resist layer 101, and may be made of a material including silicon nitride, and the like.

Specifically, an embodiment of the present disclosure also provides a liquid crystal material. As shown in FIG. 1, the liquid crystal material includes liquid crystal molecules 105 and an additive 106 mixed with the liquid crystal molecules. Under the irradiation, the additive 106 provided in this embodiment of the present disclosure polymerizes in a mixed solution with the liquid crystal molecules 105 and forms a polymer layer structure. The additive 106 has different polymerization rates under different intensities of irradiation.

In an embodiment of the present disclosure, the additive 106 includes a reactive material and a vertical alignment material. The vertical alignment material can guide the liquid crystal molecules to be vertically aligned in the liquid crystal cell. Specifically, the vertical alignment material includes one or more of the following compounds.

, and

.

The reactive material can be a commonly used active material, such as peroxides. Meanwhile, when formulating the liquid crystal material in the disclosed embodiments, a mass percentage of the reactive material is 1.0% to 20%, a mass percentage of the vertical alignment material is 1.0% to 5.0%, and a mass percentage of the liquid crystal molecules is 75% to 90%, and formulation is performed with different proportions of the above ingredients.

Figure 2:
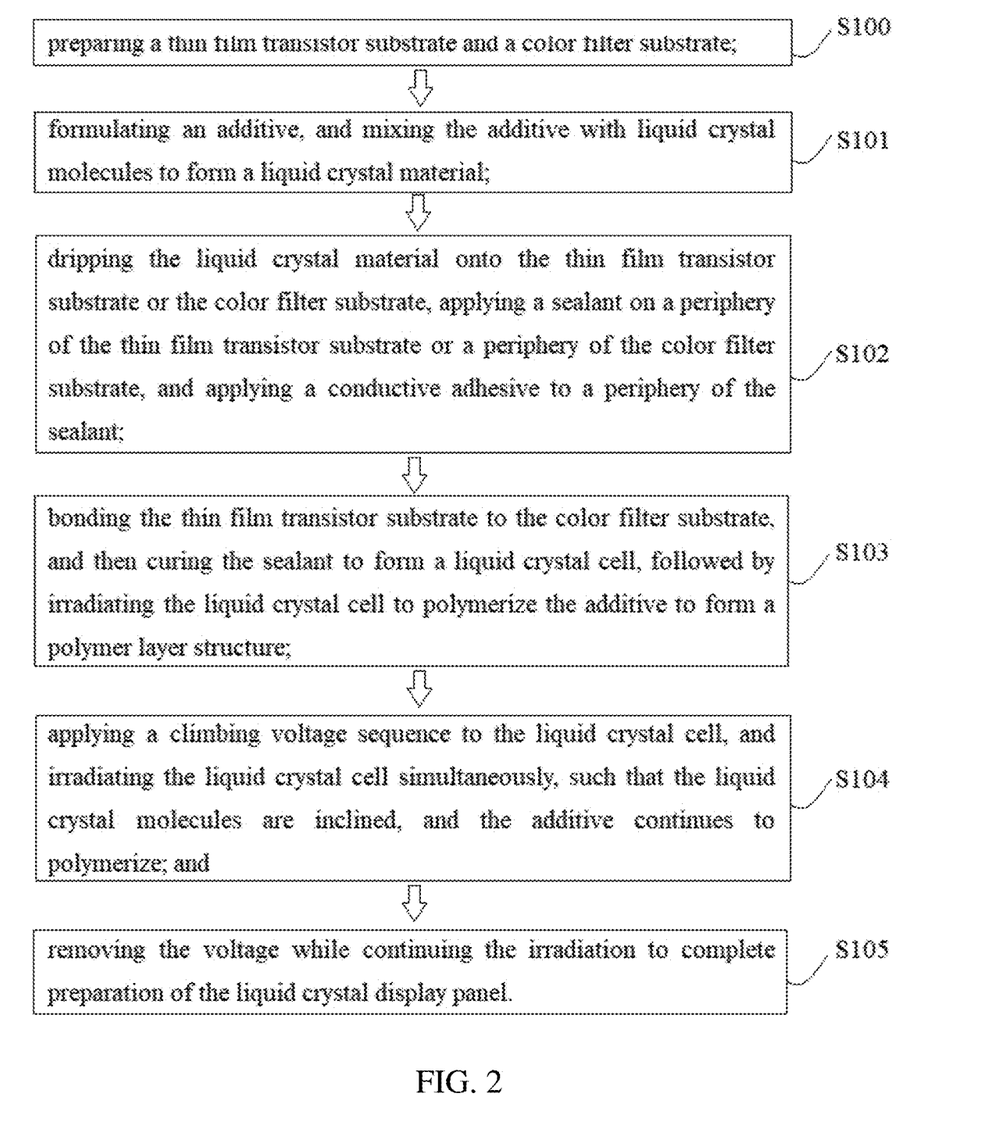
FIG. 2 is a schematic flowchart of a method of manufacturing a liquid crystal display panel according to an embodiment of the present disclosure.

Further, an embodiment of the present disclosure also provides a method of manufacturing a liquid crystal display panel. As shown in FIG. 2, FIG. 2 is a schematic flow chart of a method of manufacturing a liquid crystal display panel according to an embodiment of the present disclosure. A liquid crystal display panel without a black matrix and a polyimide alignment film can be formed by the manufacturing method, including the following steps:

S100: preparing a thin film transistor substrate and a color filter substrate;

S101: formulating an additive, and mixing the additive with liquid crystal molecules to form a liquid crystal material;

In an embodiment of the present disclosure, taking the reactive active material and the vertical alignment material as the additive as an example. In the step of formulating an additive, the additive is formulated by uniformly mixing the reactive active material, the vertical alignment material, and the liquid crystal molecules according to the following mass percentages, reactive active material:vertical alignment material:liquid crystal molecules=1.0% to 20%:1.0% to 5.0%:75% to 90%, to form the liquid crystal material in embodiments of the present disclosure.

S102: dripping the liquid crystal material onto the thin film transistor substrate or the color filter substrate, applying a sealant on a periphery of the thin film transistor substrate or a periphery of the color filter substrate, and applying a conductive adhesive to a periphery of the sealant;

After the thin film transistor substrate and the color film substrate are bonded to each other, a liquid crystal cell is formed, and the liquid crystal material is injected into the liquid crystal cell. In order to ensure the sealing performance of the bonding, a sealant is applied around the thin film transistor substrate or the color film substrate, and meanwhile a conductive adhesive is applied to a periphery of the sealant.

S103: bonding the thin film transistor substrate to the color filter substrate, and then curing the sealant to form a liquid crystal cell, followed by irradiating the liquid crystal cell to polymerize the additive to form a polymer layer structure;

S104: applying a climbing voltage sequence to the liquid crystal cell, and irradiating the liquid crystal cell simultaneously, such that the liquid crystal molecules are inclined, and the additive continues to polymerize; and S105: removing the voltage while continuing the irradiation to complete preparation of the liquid crystal display panel.

In step S103, the sealant may be cured by heat curing or ultraviolet radiation curing.

Figure 3:
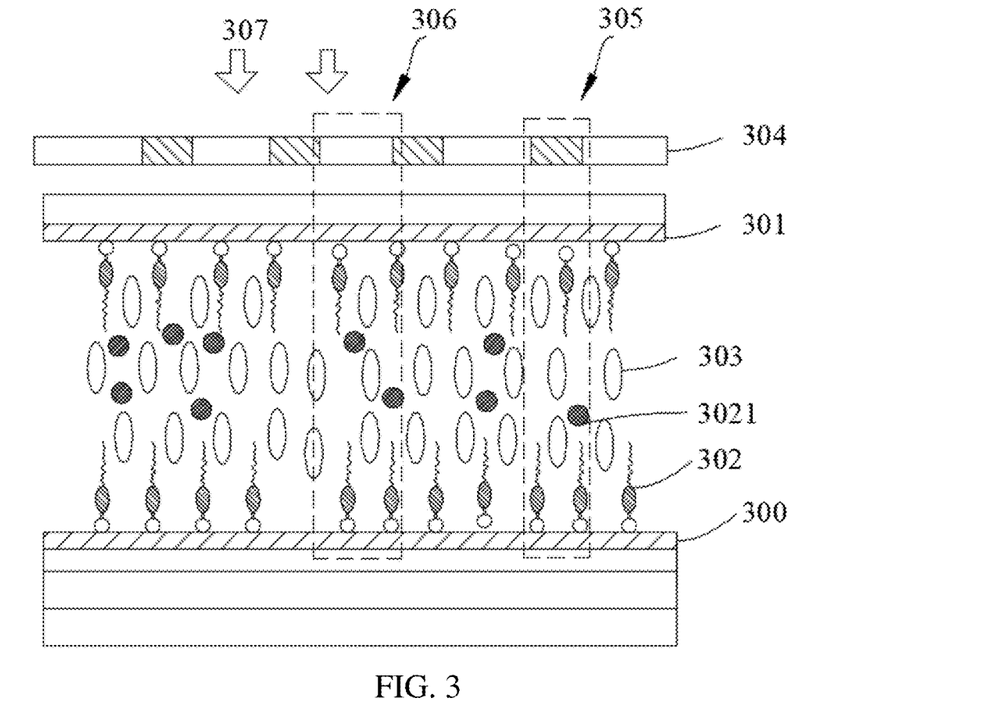
FIG. 3 is a schematic diagram of material polymerization under irradiation in an embodiment of the present disclosure.

As shown in FIG. 3, FIG. 3 is a schematic diagram of material polymerization under irradiation according to an embodiment of the present disclosure. In this embodiment of the present disclosure, the irradiation process needs to be performed three times, and in step S103, it is the first irradiation process. Specifically, before irradiation, light-transmitting plates having different light transmittances are selected. When light passes through the light-transmitting plate and reaches a surface of the liquid crystal cell, irradiations with different intensities are formed. The light-transmitting plate 304 may include a first filter area 305 and a second filter area 306. Light transmittances of the first filter area 305 and the second filter area 306 are different. Specifically, the first filter area 305 and the second filter area 306 respectively use a first cut-off filter and a second cut-off filter with different light transmittances. The first cut-off filter is, for example, a 310-330 cut filter, and the second cut-off filter is, for example, a 340-360 cut filter, which allows different areas of the LCD cell to be subjected to the irradiations with different intensities, wherein the vertical alignment material and a reactive mesogen (RM) are reacted fast at an area under irradiation with a high intensity (at the first filter area 305 with a 310-330 cut-off filter), so as to form a polymer wall connected to an upper substrate and a lower substrate, while the vertical alignment material and a reactive mesogen (RM) are reacted slowly at an area under irradiation with a week intensity (at the second filter area 306 with a 340-360 cut-off filter), to form the polymer layer on the surface of the substrate.

Correspondingly, the liquid crystal layer between the thin film transistor substrate and the color filter substrate includes the liquid crystal material provided in embodiments of the present disclosure. The liquid crystal material includes an additive and liquid crystal molecules 303. The additive includes a reactive material 3021 and a vertical alignment material 302. The vertical alignment material 302 is adsorbed on the surfaces of the first electrode 300 and the second electrode 301.

During irradiation, the area corresponding to the first filter area 305 is a high-irradiation area, where the vertical alignment material 302 and the active material 3021 can be fast reacted with each other, and can be rapidly polymerized to form the first polymer layer structure connected to an upper substrate and a lower substrate. The first polymer layer structure may be a polymer retaining wall, and opposite ends of the polymer retaining wall are respectively connected to the thin film transistor substrate and the color filter substrate.

The area corresponding to the second filter area 306 is a low-irradiation area, where the vertical alignment material 302 and the active material 3021 are reacted slowly with each other, and have a polymerization rate not as high as that of the high-irradiation area. In a low-irradiation area, the vertical alignment material 302 and the active material 3021 can only form a thin second polymer layer structure, which may be a polymer film. Accordingly, the first polymer layer structure and the second polymer layer structure provided by the embodiments of the present disclosure are formed.

In the first irradiation, ultraviolet light having an intensity of 85 to 100 mW/cm2 is employed, and a time period for the irradiation is 10 minutes to 30 minutes.

After the first irradiation is completed, a polymer layer structure is initially formed in the liquid crystal cell of the liquid crystal display panel, and the additive in the liquid crystal material is not completely reacted. Therefore, a second irradiation is applied to the additive, and in this step, the light-transmitting plate is removed under the same irradiation. Further, a climbing voltage sequence is applied to the liquid crystal cell. Under the effect of the voltage, the liquid crystal molecules will tilt, and by adjusting and maintaining a magnitude of the voltage and a driving method, the liquid crystal molecules eventually tilt in one direction. At the same time, under irradiation, the incompletely polymerized vertical alignment material 302 and the active material 3021 in the liquid crystal material will continue to polymerize, to further strengthen the polymer layer structure.

In this case, an intensity of the second irradiation is 85 to 100 mW/cm$^2$, a time period for the second irradiation is 30 to 100 seconds, which is shorter than the time period for the first irradiation.

After the second irradiation is completed, the applied voltage is removed while continuing the irradiation. This process is the third irradiation, which is mainly to completely polymerize the vertical alignment material 302 and the active material 3021 in the liquid crystal material. A time period for the third irradiation is 90 minutes to 120 minutes.

Figure 4:
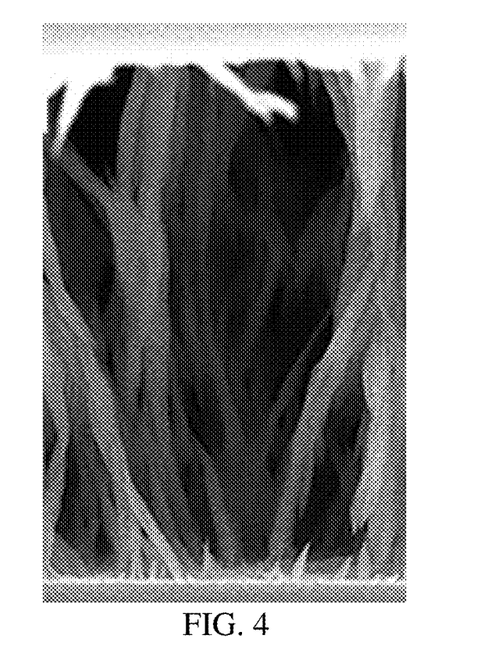
FIG. 4 is a schematic structural diagram of a first polymer layer according to an embodiment of the present disclosure.
Figure 5:
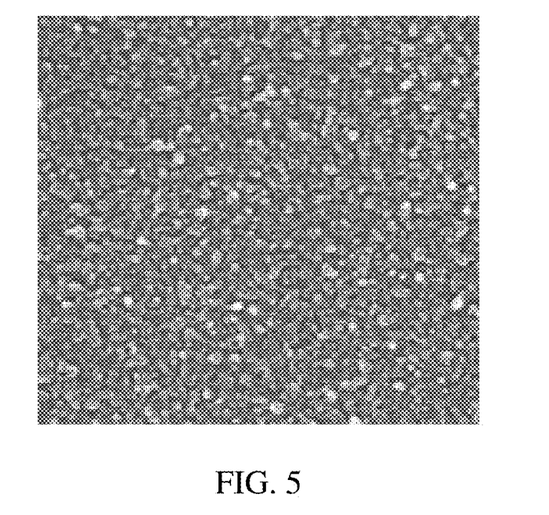
FIG. 5 is a schematic structural diagram of a second polymer layer according to an embodiment of the present disclosure.

Specifically, as shown in FIG. 4 and FIG. 5, FIG. 4 is a schematic structural diagram of a first polymer layer according to an embodiment of the present disclosure, and FIG. 5 is a schematic structural diagram of a second polymer layer according to an embodiment of the present disclosure. It can be known that the structure inside the first polymer layer structure includes more coarse fibrous structures in order to play a better blocking role, while a surface material of the second polymer layer structure is dense and flat.

Figure 6:
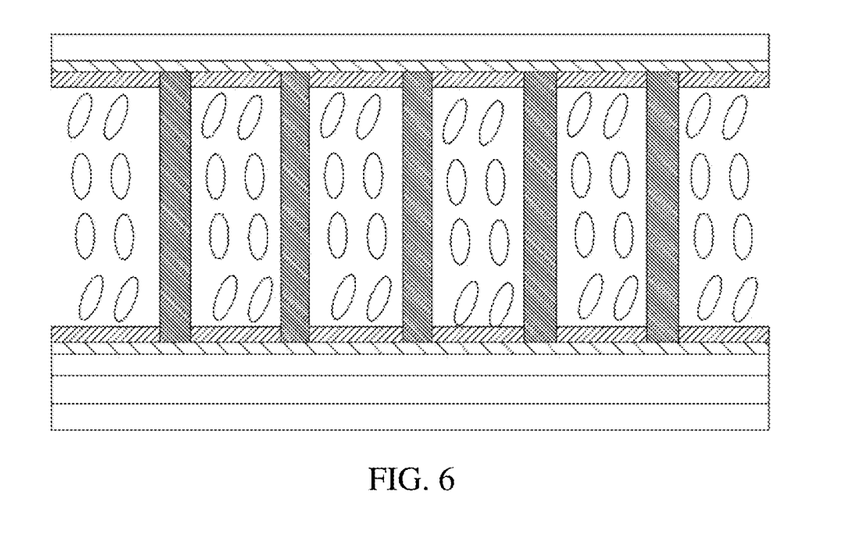
FIG. 6 is a schematic structural diagram of a display panel prepared and formed according to an embodiment of the present disclosure.

Finally, as shown in FIG. 6, FIG. 6 is a schematic structural diagram of another display panel prepared and formed according to an embodiment of the present disclosure. In combination with the structure in FIG. 1, in the display panel according to this embodiment of the present disclosure, the structures of the black matrix and the polyimide alignment film are omitted, such that the production process is simplified, and a thickness of the entire display panel is reduced, thereby solve the problem that inability of light to pass through the light-shielding part causes failure of formation of a polymer layer in the area, and also solve the problem of afterimages, thus improving the display effect of the display panel, and providing the liquid crystal molecules with ideal tilting.

The liquid crystal material, the method of manufacturing the liquid crystal display panel, and the display panel provided in the embodiments of the present disclosure have been described in detail above. The description of the above embodiments is only used to help understand the technical solution of the present disclosure and its core ideas; those of ordinary skill should understand that they can still modify the technical solutions described in the foregoing embodiments, and these modifications or replacements do not depart from the scope of the technical solutions of the embodiments of the present disclosure.

What is claimed is:

1. A liquid crystal material, comprising:
    liquid crystal molecules; and
    a vertical alignment material mixed with the liquid crystal molecules,
    wherein the vertical alignment material polymerizes under ultraviolet irradiation and forms a polymer layer structure; and
    wherein the vertical alignment material comprises one or more of the following compounds:

, and

2. The liquid crystal material according to claim 1, further comprising a peroxide.

3. The liquid crystal material according to claim 2, wherein a mass percentage of the reactive material is 1.0% to 20%, a mass percentage of the vertical alignment material is 1.0% to 5.0%, and a mass percentage of the liquid crystal molecules is 75% to 90%.

4. A liquid crystal material, comprising:
    liquid crystal molecules; and
    a reactive material and a vertical alignment material mixed with the liquid crystal molecules,
    wherein the reactive material and the vertical alignment material polymerizes under ultraviolet irradiation and forms a polymer layer structure; and
    wherein the vertical alignment material comprises one or more of the following compounds:

5. The liquid crystal material according to claim 4, wherein a mass percentage of the reactive material is 1.0% to 20%, a mass percentage of the vertical alignment material is 1.0% to 5.0%, and a mass percentage of the liquid crystal molecules is 75% to 90%.

* * * * *

UNITED STATES PATENT AND TRADEMARK OFFICE
CERTIFICATE OF CORRECTION

| | |
|---|---|
| PATENT NO. | : 11,162,027 B2 |
| APPLICATION NO. | : 16/627801 |
| DATED | : November 2, 2021 |
| INVENTOR(S) | : Lan |

It is certified that error appears in the above-identified patent and that said Letters Patent is hereby corrected as shown below:

On the Title Page

Item (30), add:
Foreign Application Priority Data
Dec. 13, 2019 (CN)......................... 201911286511.3

Signed and Sealed this
Second Day of August, 2022

Katherine Kelly Vidal
*Director of the United States Patent and Trademark Office*